(12) United States Patent
Deuerer

(10) Patent No.: US 8,999,409 B2
(45) Date of Patent: Apr. 7, 2015

(54) ANIMAL FEED

(75) Inventor: Helmut Deuerer, Bretten (DE)

(73) Assignee: Growth Finance Plus AG, Gommiswald (CH)

( * ) Notice: Subject to any disclaimer, the term of this patent is extended or adjusted under 35 U.S.C. 154(b) by 226 days.

(21) Appl. No.: 13/321,150

(22) PCT Filed: May 21, 2010

(86) PCT No.: PCT/EP2010/003125
§ 371 (c)(1),
(2), (4) Date: Dec. 6, 2011

(87) PCT Pub. No.: WO2010/133376
PCT Pub. Date: Nov. 25, 2010

(65) Prior Publication Data
US 2012/0244260 A1 Sep. 27, 2012

(30) Foreign Application Priority Data

May 22, 2009 (DE) .......................... 10 2009 022 945
Jul. 11, 2009 (DE) .......................... 10 2009 032 712

(51) Int. Cl.
| | | |
|---|---|---|
| A23K 1/18 | (2006.01) | |
| A23K 3/00 | (2006.01) | |
| A23B 4/00 | (2006.01) | |
| A23L 1/31 | (2006.01) | |
| A23L 1/315 | (2006.01) | |
| A23G 3/50 | (2006.01) | |

(Continued)

(52) U.S. Cl.
CPC ............... *A23K 1/106* (2013.01); *A23K 1/1606* (2013.01); *A23K 1/1643* (2013.01); *A23K 1/1866* (2013.01); *A23V 2002/00* (2013.01)

(58) Field of Classification Search
USPC ............... 426/1, 2, 53, 54, 92, 105, 129, 630, 426/635, 652, 512, 513, 805, 122, 578, 574
See application file for complete search history.

(56) References Cited

U.S. PATENT DOCUMENTS

| | | |
|---|---|---|
| 3,653,908 A | 4/1972 | Buck et al. |
| 3,982,003 A | 9/1976 | Mitchell et al. |

(Continued)

FOREIGN PATENT DOCUMENTS

| | | |
|---|---|---|
| DE | 26 26 996 A1 | 12/1976 |
| DE | 297 22 296 U1 | 4/1998 |
| WO | WO 97/11610 A1 | 4/1997 |

OTHER PUBLICATIONS

Whiskas pouch food (May 7, 2008), (http://web.archive.org/web/20080507234007/http://www.whiskas.com/mealtime_pouch_food/pft_turkey.aspx).*

(Continued)

*Primary Examiner* — Rena L Dye
*Assistant Examiner* — Assaf Zilbering
(74) *Attorney, Agent, or Firm* — Hackler Daghighian & Martino

(57) ABSTRACT

The invention relates to an animal feed for dogs or cats based on animal tissue, water, and hydrocolloid as a thickener, wherein the animal feed includes a water content of at least 80% by weight, preferably at least 85% by weight. According to the invention, said feed is liquid at room temperature, has a fat content at least 1% by weight and less than 5% by weight, and is packed in a tubular bag, wherein the top side and the bottom side thereof are welded at a welding surface at a front end and back end of the tubular bag, and a designed fracture point for tearing open the bag is provided at the front end in the welding surface.

21 Claims, 1 Drawing Sheet

(51) Int. Cl.
  *A23G 1/00* (2006.01)
  *A23G 3/20* (2006.01)
  *B65B 25/06* (2006.01)
  *A23K 1/10* (2006.01)
  *A23K 1/16* (2006.01)

(56) References Cited

U.S. PATENT DOCUMENTS

| | | | |
|---|---|---|---|
| 4,139,643 A * | 2/1979 | Hix et al. | 426/122 |
| 5,538,743 A * | 7/1996 | Heinemann et al. | 426/42 |
| 5,705,515 A | 1/1998 | Fisher et al. | |
| 6,171,632 B1 | 1/2001 | Lanter et al. | |
| 6,248,390 B1 | 6/2001 | Stillman | |
| 6,303,175 B1 | 10/2001 | Kuerzinger et al. | |
| 6,830,771 B2 | 12/2004 | Lanter et al. | |
| 7,189,390 B2 * | 3/2007 | Zink et al. | 424/93.45 |
| 2003/0086961 A1 * | 5/2003 | Yu et al. | 424/442 |
| 2009/0041914 A1 * | 2/2009 | Rosevear | 426/330.3 |
| 2009/0098267 A1 | 4/2009 | Pettelot et al. | |

OTHER PUBLICATIONS

Whiskas muti-pack (Jul. 8, 2008) (http://web.archive.org/web/20080708191005/http://www.whiskas.com/meal_time/pouch_food/pfc_v24.aspx).*
Anonymous: "Purrfectly Fish From Whiskas", (Aug. 5, 2010).
Anonymous: "Purrfectly Fish From Whiskas Multi-Pack", (Aug. 6, 2010).
Anonymous: "Cat Food With Poached Salmon in Sauce", (Aug. 5, 2010).
Anonymous: "Chunks in Gravy Extension", (Aug. 5, 2010).

* cited by examiner

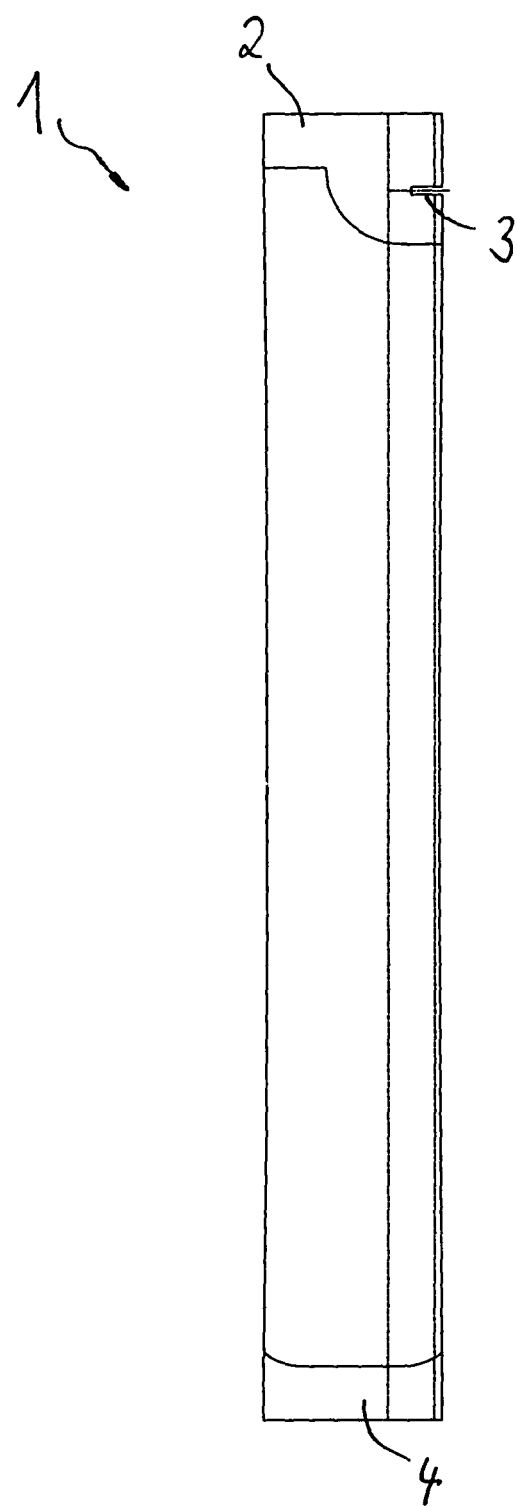

ANIMAL FEED

The invention relates to an animal feed for dogs and cats produced on the basis of animal tissue, vegetable starch and water.

The problem addressed by the present invention is that of providing a method for cost-effectively producing an animal feed which can be easily digested by house pets and can be offered to dogs and cats as a snack or reward.

Dogs and cats that are kept as house pets frequently suffer from overfeeding, and the health problems that are associated with this. An animal feed according to the invention, produced on the basis of animal tissue, vegetable starch and water, has low nutritional value due to its high water content, and can therefore be offered to house pets as a snack or a reward, without leading to the health problems that result from overfeeding, such as obesity and diabetes.

SUMMARY OF THE INVENTION

As the animal tissue, low-protein tissue, such as skin, sinews, intestines, etc., can be used. Entrails or muscle tissue, particularly a mixture of entrails and muscle tissue, are preferably used. Animal byproducts of this type are cost-effective, and also have an advantageously low calorie content. To produce an animal feed according to the invention, the animal tissue is pureed and mixed with vegetable starch, water and optionally additives, such as dyes and/or sweeteners. The mixture is then heated for several minutes to between 90° C. and 130° C. With this step, the animal feed is sterilized, and the starch is advantageously modified such that the feed obtains a viscous, non-lumpy, quick-breaking consistency, similar to ketchup. Due to its fluid, creamy consistency, an animal feed of this type can be lapped up by dogs or cats, and can be easily administered.

An animal feed according to the invention preferably has a nutritional value of less than 1 kcal, preferably less than 0.7 kcal, particularly preferably less than 0.5 kcal per gram. Therefore, snack portions of 10 g to 30 g can safely be offered even several times daily, without fear of the pet gaining weight.

The water content of the animal feed is at least 80 wt %, preferably at least 85 wt %. The animal feed has a fat content of at least 1 wt %, and less than 5 wt %, for example, 2 wt % to 4 wt %, particularly preferably less than 3 wt %. The starch content preferably amounts to less than 7 wt %, preferably less than 5 wt %, and the protein content preferably amounts to less than 8 wt %, for example, 1 wt % to 5 wt %, preferably less than 2 wt %, particularly less than 1 wt %, especially less than 0.5 wt %.

A gluten-free starch, for example, cornstarch, is preferably used as the starch. Gluten-free starch is particularly easily digestible to dogs and cats.

To improve the appearance of the animal feed, one or more dyes can be added to it. Iron oxide and/or sugar coloring are preferably used. These will give the product a pleasing red or reddish-brown color.

To improve the taste, non-nutritive sweetener, for example, xylose can be added to the animal feed. Xylose is practically non-digestible to dogs and cats, and therefore, it will not increase the nutritional value of the feed. The xylose content is preferably 0.1 wt % to 1.0 wt %, more particularly 0.1 wt % to 0.5 wt %. Alternatively or additionally, glycine may be added to the animal feed as a non-nutritive sweetener. The glycine content is preferably 0.1 wt % to 5 wt %, preferably 0.1 wt % to 2 wt %. To improve the taste, an amino acid mix can also be added. Glycine, lysine, methionine and cysteine are particularly preferable for this purpose.

The animal feed is packaged in tubular pouches or pillow packs. Portion sizes of 10 g to 30 g are particularly advantageous. This is an ideal quantity for use as a snack or treat for dogs and cats.

BRIEF DESCRIPTION OF THE DRAWING

Additional details and advantages of the invention will be specified within the context of one embodiment example, with reference to the attached drawing.

FIG. 1: shows an embodiment example of a tubular pouch containing animal feed.

DETAILED DESCRIPTION

To produce an animal feed according to the invention, animal byproducts, for example, muscle tissue and entrails or low-protein tissue such as skin, sinews or bones, are pureed and mixed with cornstarch and water to form a homogeneous mass. 100 g water is added to approximately every 5 to 10 g animal tissue and 3 to 5 g cornstarch. Dyes and/or non-nutritive sweeteners may also be added. For example, iron oxide and sugar coloring may be added as dyes, giving the animal feed a red or reddish-brown color. Xylose is also added, for example, in a quantity of 0.1 wt % to 0.5 wt %.

To improve the taste, amino acids are added, preferably glycine, lysine, methionine and/or cysteine. Amino acids can be added as an amino acid mix.

To sweeten the animal feed, glycine may be added. The amino acid content should not exceed a total of 5 wt %. For example, 0.1 wt % to 2 wt %, more particularly, 0.5 wt % to 1 wt % amino acids can be added. The glycine quantity should not exceed 5 wt %. For example, 0.1 wt % to 2 wt %, more particularly, 0.5 wt % to 1 wt % glycine can be added.

The animal feed is sterilized by the heat treatment. Additionally, the starch is advantageously modified such that the animal feed obtains a viscous, ketchup-like consistency. More particularly, the animal feed can become thixotropic as a result of the starch, in other words, it can initially have a high viscosity, which decreases under the influence of force.

The starch advantageously acts as a thickening agent. More particularly, after heating, cornstarch becomes an effective hydrocolloid, resulting in an advantageous, viscous consistency. Other possible hydrocolloids include guar gum, carrageenan, xanthan gum, carob gum and/or sodium carboxymethyl cellulose, for example. The animal feed has a fat content of 2 wt % to 5 wt %, a hydrocolloid content, more particularly, a starch content of 0.5 wt % to 6 wt %, preferably 3 wt % to 6 wt %, a protein content of 1 wt % to 5 wt %, and a water content of at least 80 wt %, preferably at least 85 wt %.

The mixture is packaged in portions inside tubular pouches and then heated to between 90° C. and 130° C. An embodiment example of a tubular pouch is illustrated in FIG. 1. For cats, a tubular pouch contains 12 g to 18 g, and for dogs, 20 g to 30 g, for example.

The length of the tubular pouches is preferably at least five times the width thereof. For example, the tubular pouches can be 7 to 10 times as long as they are wide. The tubular pouches preferably have a length of 160 mm to 180 mm, particularly preferably 165 mm to 175 mm.

The tubular pouch illustrated in FIG. 1 is sealed at both ends by welding the upper and lower ends thereof together in welding areas 2 and 4. Welding area 2 at the front end of the pouch is equipped with a predetermined breaking point 3, for example, a notch or a perforation, to facilitate tearing open of the pouch 1. Welding area 2 is extended toward the back end on the side having the notch 3, which in the drawing is the right side, preferably with a region delimited in the shape of an arch, which ends at one side at a strip-shaped region. The distance between the notch 3 and the front end of the pouch 1 is also greater than the width of welding area 2, measured in the longitudinal direction of the pouch, on the side opposite the notch 3. Thereby, when the pouch 1 is torn open, it is opened across only part of its width, preferably across less than one-half its width.

When combined with the viscous, creamy consistency of the animal feed, this measure allows the animal feed to be dispensed from a torn-open pouch only slowly. The risk of soiling by animal feed being dispensed in an uncontrolled manner is thereby advantageously counteracted. To dispense animal feed from the pouch, a user can press with the thumb and forefinger against the upper and/or lower sides, sliding the fingers up from the rear end of the pouch toward the front end of the pouch.

Welding area 4 at the rear end of the pouch is preferably 5 mm, particularly preferably at least 6 mm wide, more particularly, at least 7 mm wide. The width is measured in the longitudinal direction of the pouch 1. Advantageously, the pouch can be easily grasped at the wide welding area for squeezing the contents out. Welding area 4 is widened at its lateral edges. This allows the pouch to be completely emptied more easily.

The pouch 1 is made of a coated metal foil, for example, coated aluminum foil. The metal foil is preferably coated on both sides with plastic, for example, with polyethylene or polyethylene terephthalate. In the illustrated embodiment example, the pouch is made of aluminum foil, which is coated on one side with polyethylene and on the other side with polyethylene terephthalate. The tubular pouches are packed into cartons. Preferably, 5 to 12 tubular pouches are packed into each carton. Cardboard cartons are preferably used. The cartons preferably have a width of between 9 and 10 cm. The length of the cartons is preferably 17 cm to 19 cm, particularly preferably 17.5 cm to 18.5 cm. The animal feed can be advantageously marketed and suitably presented in practical quantities in cartons of this type.

The invention claimed is:

1. An animal feed for dogs or cats based upon animal tissue, water and a hydrocolloid as a thickening agent, said animal feed comprising:
    a water content of at least 85 wt %;
    a starch of at least 0.5 wt % and less than 6 wt %, wherein the starch comprises a gluten-free starch and is present in the form of a hydrocolloid;
    a protein content of at least 1 wt % and less than 5 wt %; and
    a fat content of at least 1 wt % and less than 5 wt %, said animal feed being packaged inside a tubular pouch, said pouch having a front end, a rear end, an upper side and a lower side, the front end and at the rear end of the pouch the upper side and the lower side being welded together in a welding area, said welding area, at the front end, having a predetermined breaking point for tearing open the pouch;
    wherein the water content, the starch, the protein and the fat content together form a thixotropic liquid at room temperature.

2. The animal feed according to claim 1, wherein the animal feed has a nutritional value of less than 1 kcal.

3. The animal feed according to claim 1, wherein the welding area is extended toward the rear end on the side that has the predetermined breaking point.

4. The animal feed according to claim 1, wherein the predetermined breaking point is provided in the welding area in such a way that the pouch is opened across only part of its width when torn open.

5. The animal feed according to claim 1, wherein the welding area is widened toward its sides at the end of the pouch facing away from the predetermined breaking point.

6. The animal feed according to claim 1, wherein the animal feed has a fat content of less than 3 wt %.

7. The animal feed according to claim 1, wherein the animal feed has a fat content of at least 2 wt %.

8. The animal feed according to claim 1, wherein the starch is cornstarch.

9. The animal feed according to claim 1, wherein the hydrocolloid content is less than 7 wt %.

10. The animal feed according to claim 1, wherein the thixotropic animal feed comprises a ketchup-like consistency having a viscosity higher than water.

11. The animal feed according to claim 1, wherein the animal feed contains iron oxide as a dye.

12. The animal feed according to claim 1, wherein the animal feed contains sugar coloring as a dye.

13. The animal feed according to claim 1, wherein the animal feed contains a non-nutritive sweetener.

14. The animal feed according to any claim 1, wherein the animal feed contains 0.1 wt % to 1.0 wt % xylose.

15. The animal feed according to claim 1, wherein the animal feed contains 0.1 wt % to 5 wt % glycine.

16. The animal feed according to claim 1, wherein the animal feed is viscous at room temperature.

17. The animal feed according to claim 1, wherein the animal feed is packaged in portions of 10 g to 30 g.

18. The animal feed according to claim 1, wherein the length of the tubular pouch is at least five times its width.

19. A carton containing 5 to 12 tubular pouches containing animal feed according to claim 1.

20. The carton according to claim 19, wherein the carton has a width of between 9 cm and 10 cm, and a length of between 17 cm and 19 cm.

21. An animal feed for dogs or cats based upon animal tissue, water and a hydrocolloid as a thickening agent, said animal feed comprising:
    a water content of at least 85 wt %;
    a starch of at least 0.5 wt % and less than 6 wt %, wherein the starch comprises a corn starch and is present in the form of a hydrocolloid;
    a protein content of at least 1 wt % and less than 5 wt %; and
    a fat content of at least 1 wt % and less than 5 wt %, said animal feed being packaged inside a tubular pouch, said pouch having a front end, a rear end, and upper side and a lower side, the front end at the rear end of the pouch the upper side and the lower side being welded together in a welding area, said welding area, at the front end, having a predetermined breaking point for tearing open the pouch;
    wherein the water content, the corn starch, the protein and the fat content blended together form a thixotropic liquid at room temperature.

* * * * *

UNITED STATES PATENT AND TRADEMARK OFFICE
CERTIFICATE OF CORRECTION

PATENT NO. : 8,999,409 B2
APPLICATION NO. : 13/321150
DATED : April 7, 2015
INVENTOR(S) : Helmut Deuerer Page 1 of 1

It is certified that error appears in the above-identified patent and that said Letters Patent is hereby corrected as shown below:

In the Claims:

In column 4, claim 14, line 28, "to any claim 1" should be changed to --to claim 1--.

In column 4, claim 21, line 53, the first "and" should be changed to --an--.

In column 4, claim 21, line 54, "end at the rear" should be changed to --end and at the rear--.

Signed and Sealed this
Fourteenth Day of July, 2015

Michelle K. Lee
*Director of the United States Patent and Trademark Office*